Feb. 21, 1928.

L. L. JACOBS 1,659,875

AUTOMATIC DAMPER

Filed Sept. 22, 1926

Inventor.
Lionel L. Jacobs.

Patented Feb. 21, 1928.

1,659,875

UNITED STATES PATENT OFFICE.

LIONEL L. JACOBS, OF TORONTO, ONTARIO, CANADA.

AUTOMATIC DAMPER.

Application filed September 22, 1926. Serial No. 137,074.

The principal object of the invention is to devise a form of damper for furnace flues which will operate automatically to regulate the draft according to variations in flue temperature and which may be readily adjusted to suit the requirements of the individual installations.

The principal feature of the invention consists in the novel construction and arrangement of parts whereby the tension of a coiled thermostatic member connected with a pivotal damper plate may be readily adjusted.

A further feature resides in the provision of an adjustable stop for the damper which may be adjusted from without to limit the movement of the damper in closing.

Figure 1:
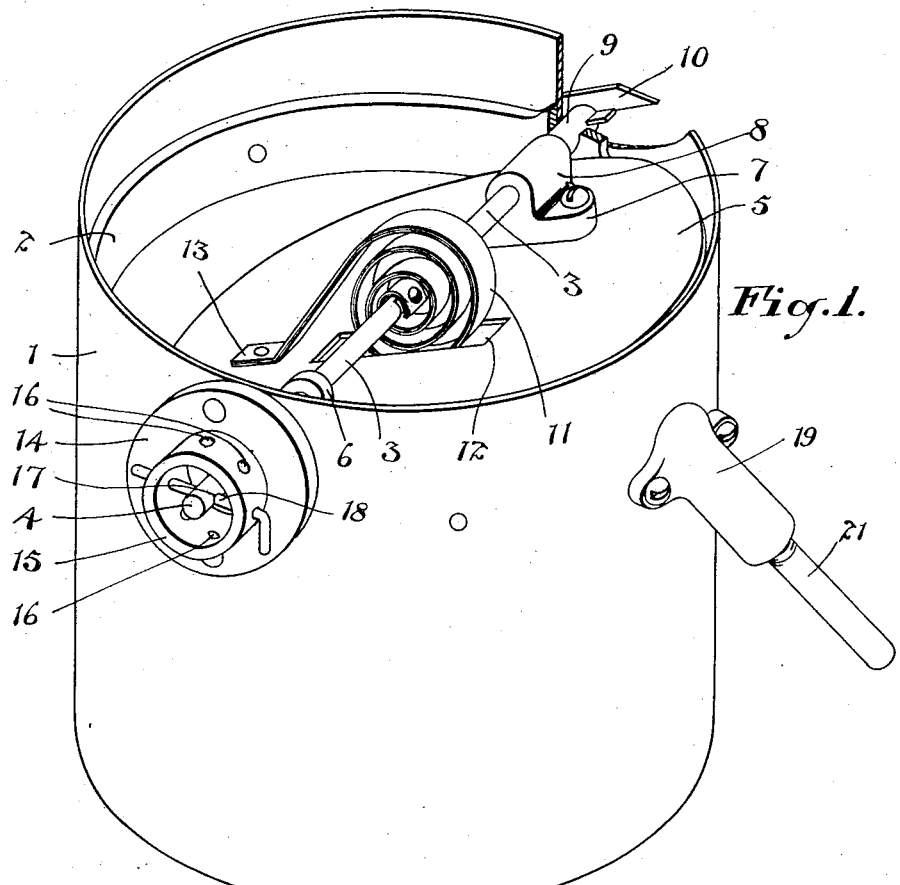

In the drawings, Figure 1 is a perspective view showing the arrangement of the device in a length of pipe.

Figure 2:
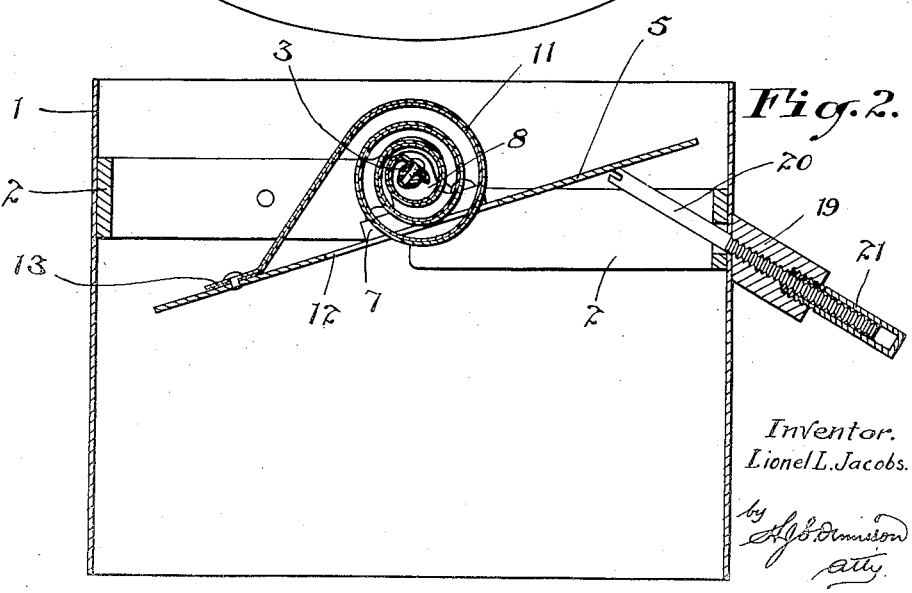

Figure 2 is a vertical mid-sectional view showing the arrangement of the thermostatic spring and adjustable stop member.

Thermostatically controlled dampers of various forms have been proposed but local conditions require adjustments being made to suit the existing conditions and the present invention proposes in a simple manner to accomplish this result by providing a damper which may be set to an adjustment to satisfactorily automatically control the fire.

In the form of the invention shown, the pipe 1 which may be of any desired size has arranged therein a ring 2 which may be of cast metal and fits snugly against the inner wall of the pipe and may be secured in place by rivets.

A light shaft 3 extends diametrically across the ring 2 and the end 4 thereof extends through a bearing in the ring and projects outwardly beyond the wall of the pipe 1.

The damper member 5 of a suitable diameter is arranged below the shaft 3 and a lug 6 extends upwardly from the damper at one side thereof, the end 4 of the rod passing through the lug and pivotally supporting the damper at one side.

Mounted on the opposite side of the damper member 5 is a block 7 having a lug projection 8 which is drilled through from its inward side and loosely encircles the free end of the shaft 3. Extending outwardly from the block 7 and in axial alignment with the shaft 3 and forming part of the block is a sleeve 9. The sleeve 9 passes through the ring 2 and is rotatable therein and extends a short distance outwardly beyond the outer wall of the pipe 1 where it may be provided with a suitable pointer 10 which will indicate the position of the damper member within the pipe.

A spirally shaped thermostat member 11 encircles the shaft 3 midway of its length, the inner end thereof being rigidly secured to the shaft in any desired manner. The thermostat member 11 is formed from a length of the usual composite material having its wall formed of two layers of metal each having a different co-efficient of expansion.

An opening 12 is cut in the damper member 5 centrally thereof to accommodate the lower extremity of the thermostatic member 11 and the free end 13 of the thermostat extends towards the outer edge of the damper member 5 and is rigidly secured thereto.

Secured to the pipe 1 is a member 14 having an annular flange 15 encircling the projecting end 4 of the shaft, the flange 15 being provided with a number of oppositely arranged holes 16 which extend radially therethrough. A hole 17 is drilled through the end 4 of the shaft and a pin 18 is passed therethrough and through the holes 16, thus locking the shaft in any desired position.

Threaded in a boss 19 mounted on the pipe 1 is an adjustable stop 20 which is adapted to extend inwardly below the adjacent side of the damper member 5 to engage the same to limit its movement in the closed direction. The inward end of the stop 20 is not threaded.

A cap 21 may be threaded into the boss 10 and encloses the outer end of the stop 20 thus preventing the member 20 from being tampered with when the proper setting has been obtained.

The device is so set that when there is no fire burning in the furnace the damper member 5 will be in a position longitudinally of the pipe 1, this position being determined by the pin 18 passing through the hole 17 in the shaft.

Upon the fire being lighted, the hot gases passing through the pipe 1 come in contact with the thermostat member 11 and as the temperature of the member 11 increases it expands spirally and gradually turns the damper on its pivot until it assumes a position relative to the flue temperature. The damper thus automatically retains a draft opening proportional to the intensity of the fire.

If for any reason the fire should become so hot as to cause the damper to rotate past its normal position, the stop 20 is provided to limit its movement so that the flue passage cannot be cut down to too small an area and cause noxious gases to be discharged into the furnace room or cause such an accumulation of unburnt gases which might result in an explosion.

A device such as described will be applicable to stoves or furnaces of various types and will be extremely efficient in its function of preventing the gases of combustion being drawn too rapidly through the furnace over the heating surfaces.

It will be readily appreciated by those skilled in the art that flue conditions vary to a very marked degree due to size, construction and location as well as to the differences in furnace equipment and it is very important that an automatic damper must be capable of adjustment to meet these conditions as well as to account for variation in the physical structure of the dampers. The present invention having the thermostatic spring adjustable and also being provided with an adjustable stop has been found to meet the required conditions.

What I claim as my invention is:—

1. An automatic damper comprising, the combination with the flue pipe, of a ring secured to the inner periphery of said pipe and having a bearing extending therethrough, a damper plate disposed within said ring having a trunnion supported in said bearing, a shaft rotatably mounted in said ring and pivotally supporting said damper plate at the side opposite said trunnion and having one end extending outwardly beyond the wall of said pipe, a coiled thermostatic spring encircling said shaft having one end secured thereto and the other end connected with said damper plate, and means secured to said flue pipe engaging the extending end of the shaft for locking the same in various adjusted positions.

2. An automatic damper comprising, the combination with the flue pipe, of a shaft mounted in said flue extending transversely thereof and having one end extending outwardly therebeyond, a boss mounted on said flue pipe having an annular flange encircling said projecting end of the shaft, radially disposed holes arranged in said annular flange, a hole in the projecting end of said shaft in alignment with the aforesaid holes, a removable pin passing through the aligned holes and adjustably locking said shaft in a fixed position, a damper plate pivotally suspended from said shaft, a thermostatic spring secured to the shaft and having its free end connected with said damper plate, and means for limiting the movement of said damper plate in the closed direction.

3. An automatic damper comprising, the combination with the flue pipe, of a shaft mounted in said flue extending transversely thereof, a damper plate arranged below said shaft and having a lug extending upwardly at one side thereof pivotally supported on said shaft, a bearing member secured to the other side of said damper member and being drilled to receive the end of said shaft and having a cylindrical portion extending outwardly therefrom through the wall of said flue pipe concentric with said shaft, an indicator secured to the outward end of said cylindrical portion, a thermostatic spring secured to and encircling said shaft and operatively connected with said damper plate, and means for locking said shaft in various adjusted positions.

4. An automatic damper comprising, the combination with the flue, of a damper pivotally suspended within said flue, a thermostatic spring arranged within said flue having one end adjustably fixed with relation to the flue and having the other end operatively connected with said damper, a threaded boss extending from the wall of said flue, a rod threaded into said boss from the inner side and adapted to engage said damper to limit its degree of closing, and a cap member threaded into said boss and enclosing the outward end of said stop member.

LIONEL L. JACOBS.